(12) United States Patent
Washio

(10) Patent No.: US 10,237,446 B2
(45) Date of Patent: Mar. 19, 2019

(54) CORRECTING IMAGE DATA BY ADJUSTING PIXELS AT A DETERMINED DISTANCE FROM AN EDGE

(71) Applicant: Konica Minolta, Inc., Tokyo (JP)

(72) Inventor: Koji Washio, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/686,398

(22) Filed: Aug. 25, 2017

(65) Prior Publication Data

US 2018/0063370 A1 Mar. 1, 2018

(30) Foreign Application Priority Data

Aug. 30, 2016 (JP) .................................. 2016-167451

(51) Int. Cl.
*H04N 1/409* (2006.01)
*H04N 1/407* (2006.01)
*G06T 7/11* (2017.01)
*G06T 7/13* (2017.01)
*G03G 15/00* (2006.01)
*G06T 1/20* (2006.01)
*H04N 1/32* (2006.01)
*H04N 1/40* (2006.01)
*G03G 15/04* (2006.01)

(52) U.S. Cl.
CPC ..... *H04N 1/4072* (2013.01); *G03G 15/04045* (2013.01); *G03G 15/50* (2013.01); *G06T 1/20* (2013.01); *G06T 7/11* (2017.01); *G06T 7/13* (2017.01); *H04N 1/32358* (2013.01); *H04N 1/40068* (2013.01); *H04N 1/4092* (2013.01); *H04N 2201/0082* (2013.01)

(58) Field of Classification Search
CPC ............. H04N 1/4072; H04N 1/32358; H04N 1/40068; H04N 1/4092; H04N 2201/0082; G03G 15/04045; G03G 15/50; G06T 7/13; G06T 1/20; G06T 7/11
See application file for complete search history.

(56) References Cited

FOREIGN PATENT DOCUMENTS

| JP | H7-175367 A | 7/1995 |
| JP | H10-142856 A | 5/1998 |
| JP | H11-196277 A | 7/1999 |
| JP | H11-346315 A | 12/1999 |
| JP | 2009-58765 A | 3/2009 |

*Primary Examiner* — Christopher Wait
(74) *Attorney, Agent, or Firm* — Osha Liang LLP

(57) ABSTRACT

An image processing apparatus includes: a pipeline processor that inputs image data shifted 1 pixel at a time in a sub-scanning direction; a detector that inputs and holds each pixel of the image data, compares each pixel value of the held plurality of pixels, and detects an edge of a front end or a rear end of an object; a counter that counts a number of pixels that each pixel of the image data shifted in the sub-scanning direction; a distance coefficient determiner that uses a count value of the counter to determine a distance coefficient; a correction value calculator that calculates a correction value; a corrector that adds the correction value of each pixel to the pixel value of each pixel of the image data; and a position where the correction value is added is a position shifted at least N+1 pixels.

20 Claims, 15 Drawing Sheets

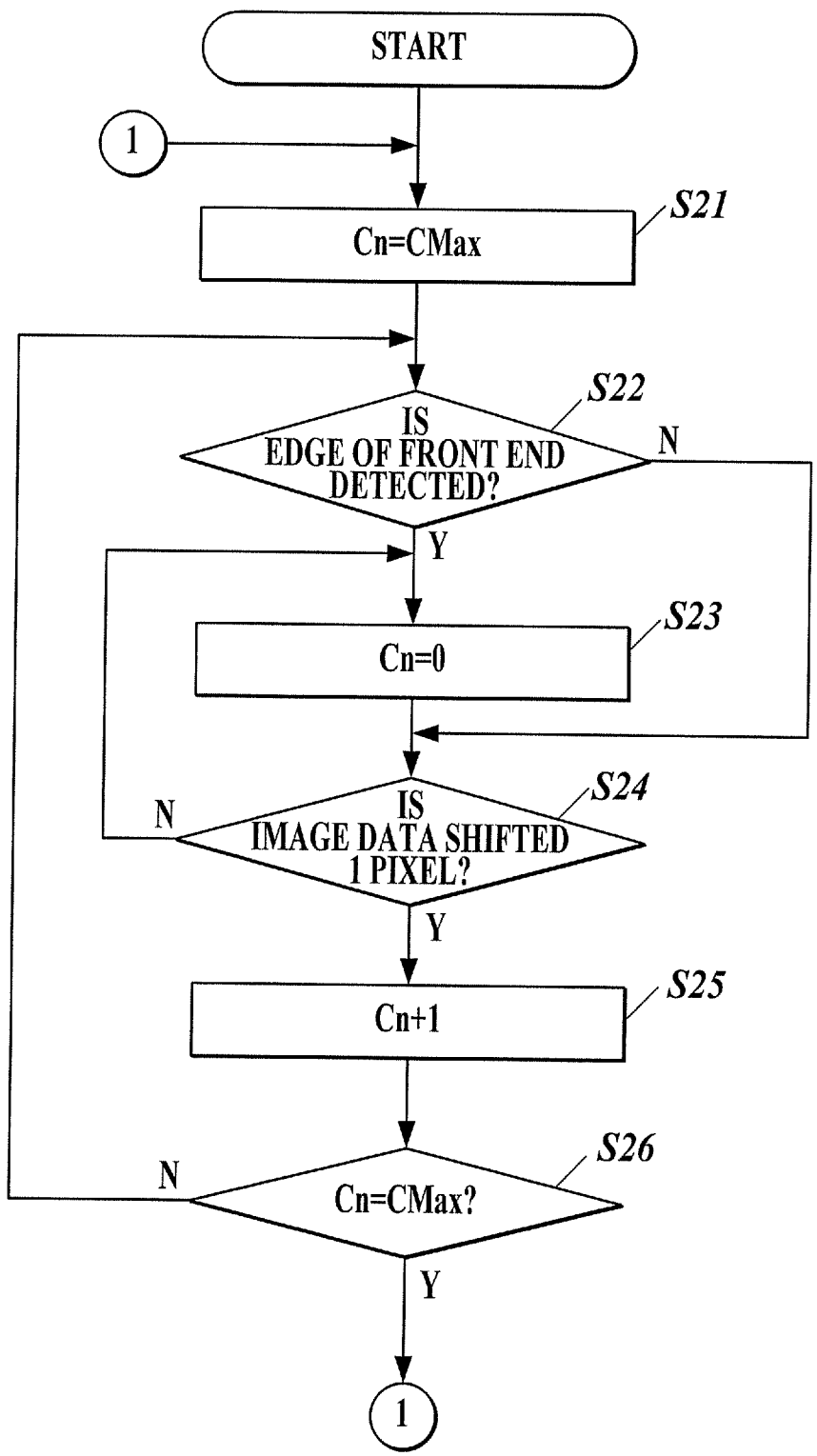

SHIFT DIRECTION

— : ORIGINAL DENSITY
--- : DENSITY WHEN SWEEPING OCCURS

SHIFT DIRECTION

— : BEFORE CORRECTION
--- : AFTER CORRECTION

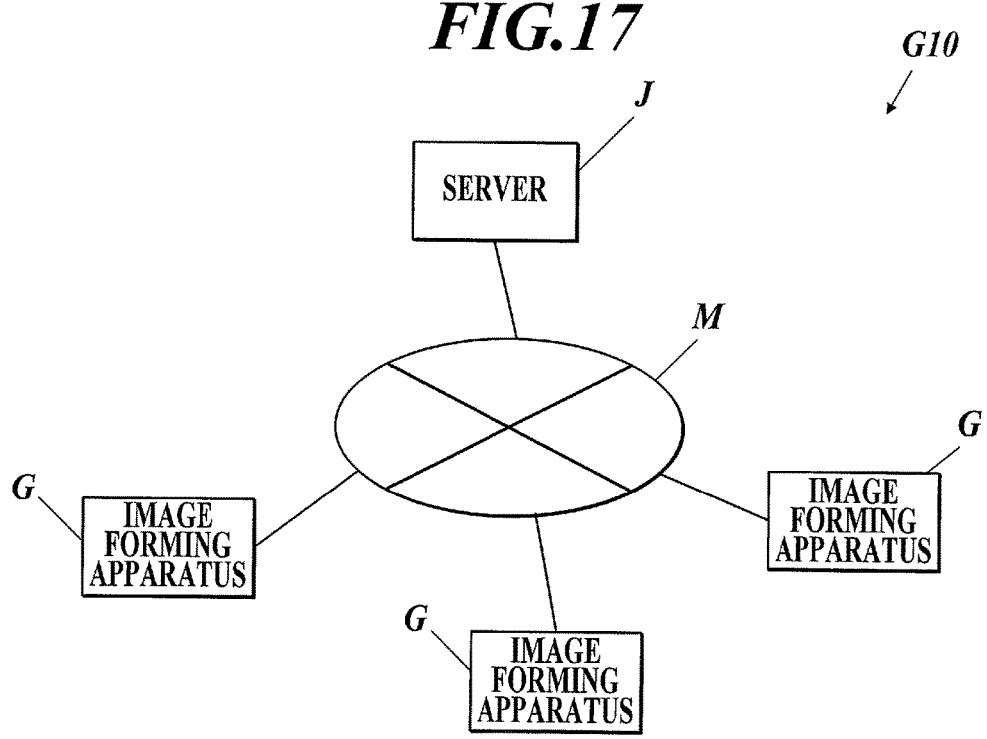
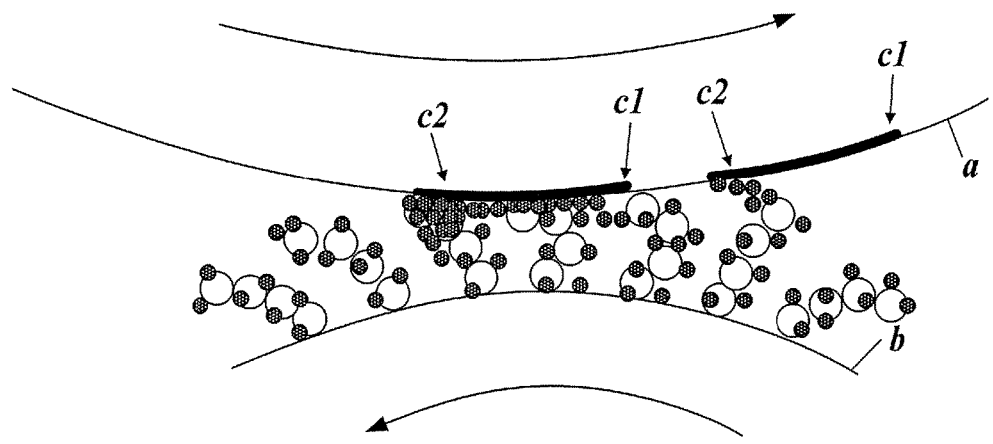

CORRECTING IMAGE DATA BY ADJUSTING PIXELS AT A DETERMINED DISTANCE FROM AN EDGE

CROSS-REFERENCE TO RELATED APPLICATIONS

This application claims priority to Japanese Patent Application No. 2016-167451 filed on Aug. 30, 2016, the entire disclosure of which is incorporated by reference.

TECHNOLOGICAL FIELD

The present invention relates to an image processing apparatus, an image forming apparatus, an image forming system, and an image processing method.

BACKGROUND

As the developing method of the electro-photographic process, there is a method to rotate the developing sleeve and the photoreceptor in the same direction and a method to rotate the above in the opposite direction. The prior is called a "with method" and the latter is called a counter method. Among the above, according to the counter method, as shown in FIG. 18, due to a developing sleeve b rotating in a direction opposite of a photoreceptor a, the toner on an image front end c1 side is pushed swept to a rear end c2 side by a tip of the carrier. This causes worsening of the image quality called blur in which density of the image is light at the front end c1 and sweeping in which the density becomes dark at the rear end c2. According to the with method, the above occurs with the front end and the rear end of the image being opposite.

Methods to improve the uneven distribution of toner by image processing are proposed (for example, see Japanese Patent Application Laid-Open Publication No. 2009-58765, Japanese Patent Application Laid-Open Publication No. H11-196277, Japanese Patent Application Laid-Open Publication No. H11-346315). For example, the region in which variation in density occurs due to sweeping of toner is estimated based on edges of characters and shapes detected by analyzing the image data and correction is performed to increase the pixel value in the region where decrease of density occurs and to decrease the pixel value in the region where increase in density occurs.

There is also a method to detect the variation of density of the image with the sensor and to adjust the developing condition according to the detected density variation (for example, see Japanese Patent Application Laid-Open Publication No. H7-175367, Japanese Patent Application Laid-Open Publication No. H10-142856).

According to the above cited documents which correct the image data, the edge of the image such as characters and shapes are detected, and from the edge direction, contrast, etc., the image region to be corrected and the correction value are determined. Since it is necessary to observe the image region near the edge to be detected and the image region to be corrected at the same time, at least the image data including both image regions are deployed in the memory. The image region held in the memory for such observation is typically called an observation window.

For example, in order to detect the edge of the image which is the start of sweeping, it is necessary to observe the pixel value of both the inside and the outside of the edge at the same time, and the region with 3 to 5 pixels is necessary. The sweeping may occur 0.6 mm in the sub-scanning direction in a wide range, and when the resolution is 600 dpi, 0.6 mm corresponds to 15 pixels. As shown in FIG. 19, when the region with 5 pixels is observed to detect the edge, and the region with 15 pixels from the edge is corrected, the observation window with 17 pixels including both regions is necessary. That is, in order to correct blur and sweeping, it is necessary to obtain a memory with a size including 17 pixels (N=17) in the sub-scanning direction.

As the observation window becomes larger, the necessary memory capacity increases, the circuit scale is enlarged, and conventionally, a means to decrease the memory capacity in order to suppress the circuit scale was not considered. According to Japanese Patent Application Laid-Open Publication No. 2009-58765, Japanese Patent Application Laid-Open Publication No. H11-196277, and Japanese Patent Application Laid-Open Publication No. H11-346315, rich memory resources such as the work memory and the page memory used by the CPU are assumed and there is no consideration in optimizing the memory capacity to be used to a minimum amount.

According to the image forming apparatus such as a copier or a printer, a plurality of types of image processes are connected by a pipeline process in order to enhance image quality from the viewpoint of simplifying the configuration of the apparatus and enhancing performance (throughput). The pipeline process connects the plurality of process elements in a series, and a certain process cannot reuse the resources used in the previous process (circuit, processing apparatus, memory, etc.). When the memory corresponding to the above-described large observation window is mounted in such processing circuit of the pipeline process, the circuit scale becomes massive and this leads to increase in costs.

SUMMARY

One or more embodiments of the present invention reduce the memory capacity used in the correction of the image data on which a pipeline process is performed.

According to one or more embodiments of the present invention, an image processing apparatus includes: a pipeline processor which inputs image data shifted 1 pixel at a time in a sub-scanning direction, performs a plurality of types of image processes, and outputs a result; a detector which inputs and holds each pixel of the image data input in the pipeline processor in a unit of a plurality of pixels in the sub-scanning direction, compares each pixel value of the held plurality of pixels, and detects an edge of a front end or a rear end of an object; a counter which counts a number of pixels that each pixel of the image data shifted in the sub-scanning direction from when the detector detected the edge of the front end or the rear end; a distance coefficient determiner which uses a count value of the counter to determine a distance coefficient which adjusts the pixel value of each pixel of the object in a range of N pixels from the edge of the front end or the rear end according to a distance from the edge of the front end or the rear end; a correction value calculator which calculates a correction value of each pixel of the object using the distance coefficient determined by the distance coefficient determiner; and a corrector which adds the correction value of each pixel calculated by the correction value calculator to the pixel value of each pixel of the image data output shifted 1 pixel at a time in the sub-scanning direction from the pipeline processor, wherein, a position where the correction value is added by the corrector is a position shifted at least N+1 pixels from a position where each pixel is input to the detector.

According to one or more embodiments, the image processing apparatus further includes, an edge strength determiner which determines edge strength of the edge of the front end or the rear end; a density coefficient determiner which determines a density coefficient according to the pixel value of the object in which the edge of the front end or the rear end is detected; a line width coefficient determiner which determines a line width coefficient according to a number of pixels from the edge of the front end to the edge of the rear end; and a correction coefficient outputting unit which calculates a correction coefficient using at least one of the edge strength determined by the edge strength determiner, the density coefficient determined by the density coefficient determiner, and the line width coefficient which is determined by the line width coefficient determiner, wherein, the correction value calculator uses a distance coefficient determined by the distance coefficient determiner and the correction coefficient calculated by the correction coefficient outputting unit to calculate the correction value.

According to one or more embodiments, the image processing apparatus further includes a memory which holds the correction coefficient of each pixel in the image data calculated by the correction coefficient outputting unit and the count value of the counter.

According to one or more embodiments, the image processing apparatus further includes an averaging processor which performs weighted averaging of the pixel value after correction for each pixel when an original pixel value of each pixel adjacent in a main scanning direction of the image data is same.

According to one or more embodiments, the image processing apparatus further includes an attribute determiner which inputs attribute data of the image data and determines an attribute of each pixel of the image data shown in the attribute data, wherein the corrector switches whether to add the correction value to each pixel according to the attribute of each pixel determined by the attribute determiner.

BRIEF DESCRIPTION OF THE DRAWINGS

One or more embodiments of the invention will become more fully understood from the detailed description given hereinbelow and the appended drawings which are given by way of illustration only, and thus are not intended as a definition of the limits of the present invention.

FIG. 3 is a flowchart showing a count operation of a counter according to one or more embodiments.

FIG. 17 is a block diagram showing a configuration of an image forming system according to one or more embodiments of the present invention.

FIG. 18 is a diagram showing a toner sweeping phenomenon in a counter method.

DETAILED DESCRIPTION

Hereinafter, embodiments of the image processing apparatus, image forming apparatus, image forming system, and image processing method according to the present invention will be described with reference to the drawings. However, the scope of the invention is not limited to the disclosed embodiments.

[Image Processing Apparatus]

Figure 1:
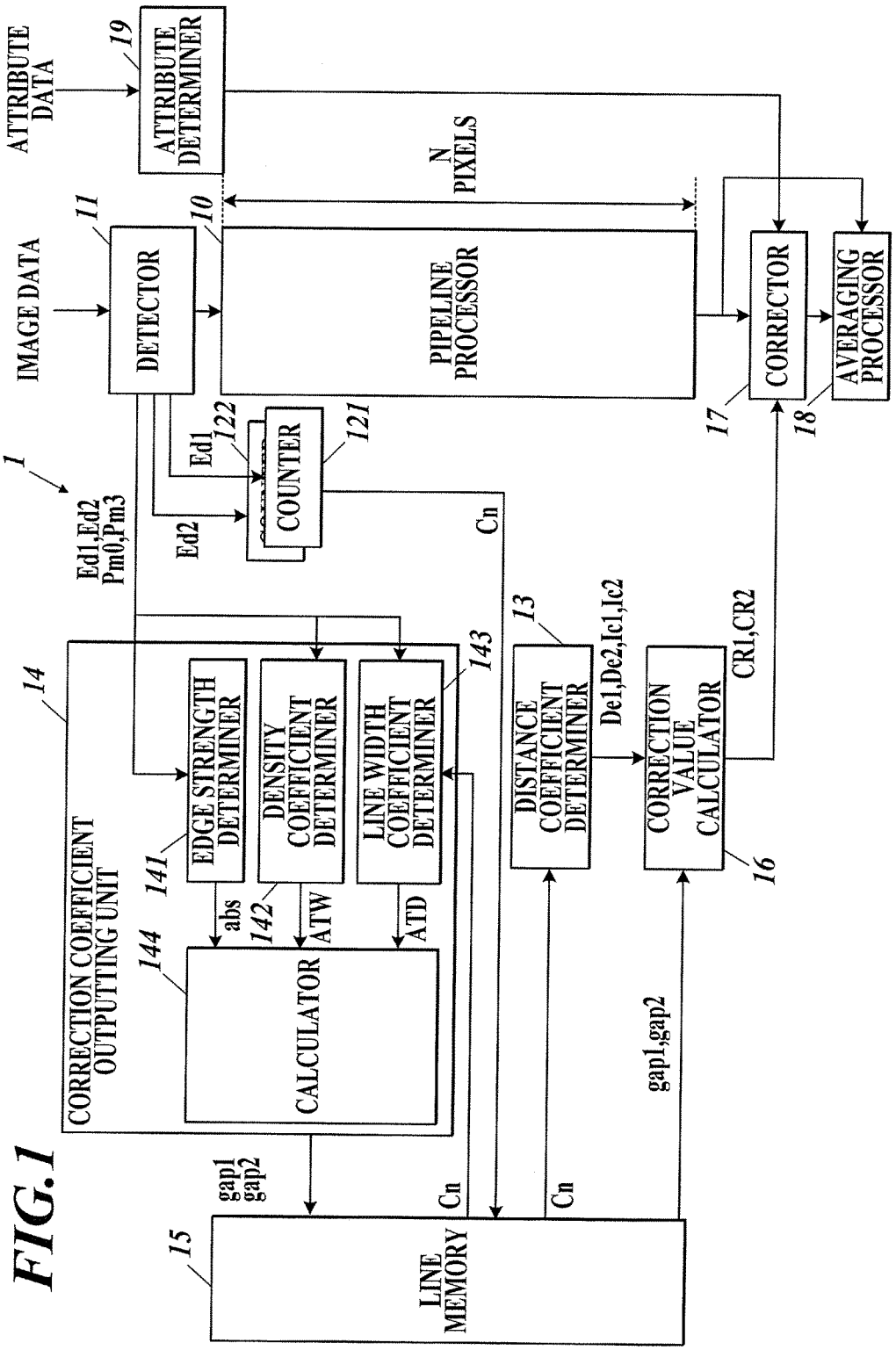
FIG. 1 is a block diagram showing a configuration of an image processing apparatus according to function according to one or more embodiments of the present invention.

FIG. 1 shows a configuration of the image processing apparatus 1 according to one or more embodiments of the present invention.

The image processing apparatus 1 corrects an image data processed by a pipeline process so that variation in density such as sweeping, blur, suction, etc. occurring in a front end and rear end of an image such as characters and diagrams can be reduced.

As shown in FIG. 1, the image processing apparatus 1 includes a pipeline processor 10, a detector 11, counters 121 and 122, a distance coefficient determiner 13, a correction coefficient outputting unit 14, a line memory 15, a correction value calculator 16, a corrector 17, an averaging processor 18 and an attribute determiner 19.

The image processing apparatus 1 describes correcting image data with a data value of 8 bits showing density of 1 pixel with 0 to 255 stages. The data amount of the image data is not limited to the above.

The pipeline processor 10 inputs image data output from the edge detector 11 1 pixel at a time in a sub-scanning direction, performs a plurality of types of image processes while shifting the input image data 1 pixel at a time in a sub-scanning direction, and outputs the result. The shift direction of the image data is the same as the shift direction of the image formed on a photoreceptor by electrophotography.

In one or more embodiments, when the size of the region in which the density variation occurs in the front end and rear end of the object due to sweeping of the toner is represented as N pixels, the pipeline processor 10 includes a line memory in which the size in the sub-scanning direction is N pixels or more and a plurality of types of image processing elements which perform image processes on the image data held by the line memory. The pixel number N in the sub-scanning direction as the correction target can be determined according to the size of the image region in the sub-scanning direction in which the toner sweeping occurs when the image is actually formed on the sheet by electrophotography.

[Edge Detection]

In one or more embodiments, the detector 11 inputs and holds pixels of image data input in the pipeline processor 10 shifted in the sub-scanning direction 1 pixel at a time in a unit of plurality of pixels in the sub-scanning direction including the pixels, and by comparing the pixel values of the held plurality of pixels, the edge of the front end or the rear end of the object is detected. The object is the image portion such as characters, diagrams, photographs, etc. The detector 11 may include a memory holding the image data such as the line memory and a processing circuit for the edge detection.

The unit region of the image data held by the detector 11 for edge detection is referred to as an observation window. The size of the observation window in the sub-scanning direction can be determined according to the size of the image region necessary for edge detection in the sub-scanning direction, for example, 3 to 5 pixels. The size of the observation window in the main scanning direction is to be M pixels which is the same as the size of the image data in the main scanning direction. When the size of the observation window in the sub-scanning direction is 4 pixels, the detector 11 inputs the image data in the M×4 pixel unit including a target pixel and 3 pixels positioned 1 to 3 pixels before the target pixel in the sub-scanning direction.

Figure 2:
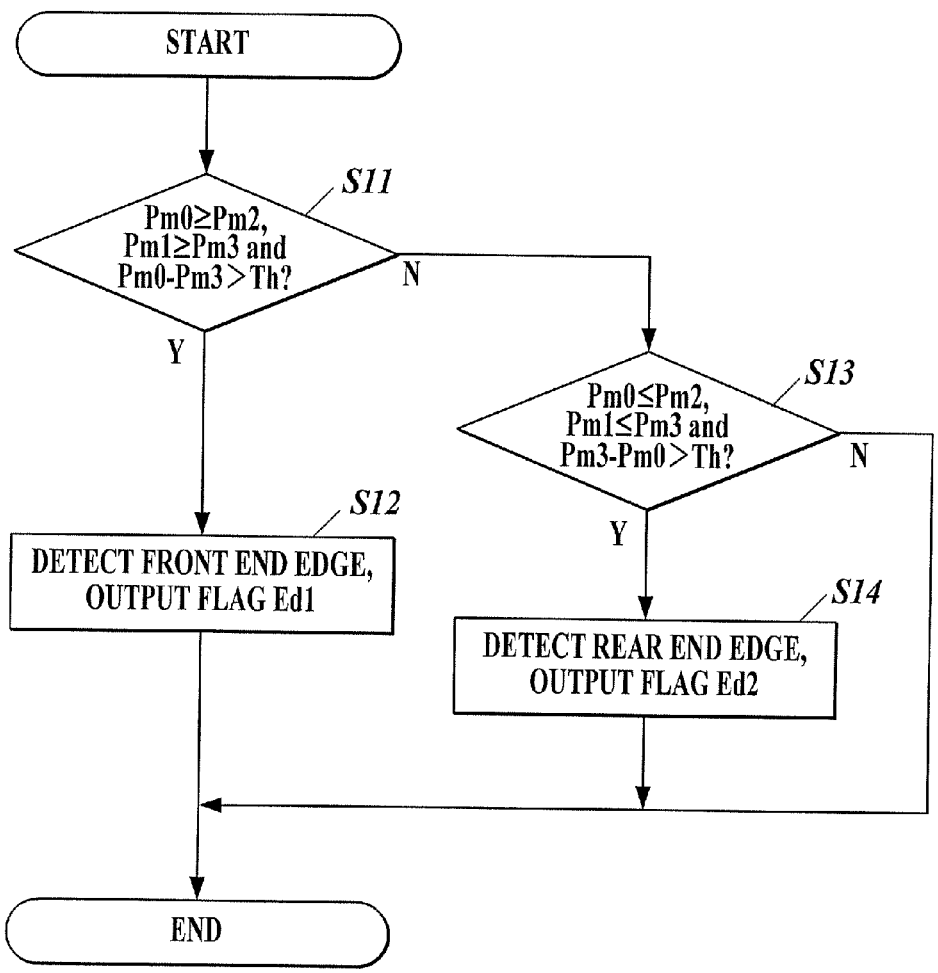
FIG. 2 is a flowchart showing an order of an edge detecting process according to one or more embodiments.

FIG. 2 shows a specific process order of the detector 11 according to one or more embodiments.

In one or more embodiments, in the front end edge of the object, the pixel value monotonically increases with the edge as the start, and in the rear end edge of the object, the pixel value monotonically decreases with the edge as the start. The detector 11 compares the pixel value of the pixels aligned in the sub-scanning direction to determine whether the pixel values in the M×4 pixels input in the observation window monotonically increases or monotonically decreases in the sub-scanning direction. The pixel value of the target pixel input in the observation is represented as Pm0, and the pixel values of each pixel positioned 1 to 3 pixels before the target pixel in the sub-scanning direction are represented as Pm1, Pm2 and Pm3.

As shown in FIG. 2, when the compared pixels values Pm0 to Pm3 satisfy the relation as shown in formula (1) described below (step S11: Y), since the pixel values are monotonically increasing, the detector 11 detects the edge of the front end between the target pixel and 1 pixel before the target pixel. The detector 11 outputs a flag Ed1 showing the edge of the front end is detected (step S12).

$$Pm0 \geq Pm2,\ Pm1 \geq 3\ \text{and}\ Pm0-Pm3 > Th \quad (1)$$

When the compared pixel values Pm0 and Pm1 to Pm3 satisfy the relation as shown in formula (2) described below (step S11: N, S13: Y), since the pixel values are monotonically decreasing, the detector 11 detects the edge of the rear end between the target pixel and 1 pixel before the target pixel. The detector 11 outputs the flag Ed2 showing the edge of the rear end is detected (step S14).

$$Pm0 \leq Pm2,\ Pm1 \leq 3\ \text{and}\ Pm3-PM0 > Th \quad (2)$$

The Th in the above-described formulas (1) and (2) are edge determining thresholds and can be set freely.

Even if the above formula (1) is satisfied, when the count value of the counter 121 is equal to or less than a certain value, the detector 11 invalidates the edge detection of the front end. With this, erroneous detection of the edge can be prevented when the monotonic increase continues.

Similarly, even if the above formula (2) is satisfied, when the count value of the counter 122 is equal to or less than a certain value, the detector 11 invalidates the edge detection of the rear end. With this, erroneous detection of the edge can be prevented when the monotonic decrease continues.

When the pixel values Pm0 to Pm3 do not satisfy both formulas (1) and (2) (step S11: N, S13: N), since there is no edge in the front end and the rear end, the flag is not output and the process ends.

The detector 11 repeats the above process while shifting the input image data 1 pixel in the sub-scanning direction.

[Counter]

The two counters 121 and 122 each count the number of pixels that each pixel of the image data shifted in the sub-scanning direction after the edge of the front end or the rear end is detected by the detector 11.

The sweeping occurs in the range from before the N line of the rear end edge to the rear end edge. The blur occurs in the range from the front end edge to rear the N line. In order to correct both at the same time, it is necessary to count at least two times the value of N with the counter. Therefore, the counters 121 and 122 should be able to count at least two times N. When N=15, the maximum value of the counter range may be 2N+1, for example, 0 to 31.

FIG. 3 shows a specific process of counting with the counter 121 according to one or more embodiments. The counter 122 counts with the same process as the counter 121 other than resetting the count value Cn according to the flag Ed2 instead of the flag Ed1.

As shown in FIG. 3, the default value of the counter 121 is set to the maximum value CMax of the count range (step S21). When the count range is 0 to 31, CMax=31.

In one or more embodiments, when the flag Ed1 is output by edge detection of the front end (step S22: Y), the counter 121 resets the count value Cn to 0 (step S23). When the image data shifts 1 pixel in the sub-scanning direction in the pipeline processor 10 (step S24: Y), the counter 121 increments 1 to the count value Cn (step S25).

When the count value Cn after incrementing does not reach the maximum value CMax (step S26: N), the process returns to step S22, and the counter 121 continues to count the number of shifting pixels. During the count, when the edge of the front end is not detected (step S22: N), and the count value Cn reaches the maximum value CMax (step S26: Y), the process returns to step S21, and the maximum value CMax is maintained until the edge of the front end is detected.

[Distance Coefficient]

The distance coefficient determiner 13 determines the distance coefficient Dc1, Dc2, Ic1, and Ic2 which adjusts the pixel value of each pixel in the object within the range of N pixels from the edge of the front end or the rear end according to the distance of each pixel from the edge of the front end or the rear end.

The density variation by the sweeping of the toner becomes large when closer to the edge of the front end and the rear end. The correction value can be controlled by the distance coefficients Dc1, Dc2, Ic1, and Ic2 so that the correction amount becomes larger as the distance from the edge becomes shorter.

The relation between the distance from the edge and the density variation amount is different depending on whether the developing method is the counter method or the with method, or whether the edge is the front end edge or the rear end edge.

Figure 4A:
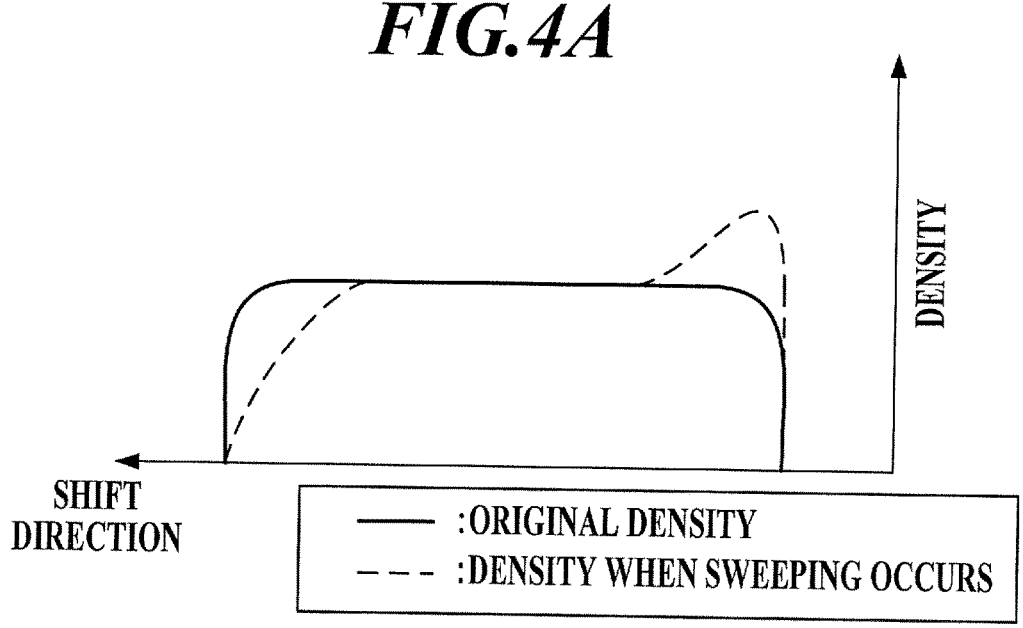
FIG. 4A is a diagram showing a density variation example in a counter method according to one or more embodiments.

FIG. 4A shows an example of the density variation of the object according to the counter method of one or more embodiments. As shown in FIG. 4A, originally, the density of the object is substantially constant. However, due to the sweeping of toner in the counter method, blur occurs in the front end side of the object, and the density drastically decreases in portions closer to the edge of the front end. In the rear end side of the object, the density drastically increases in portions closer to the edge of the rear end.

Figure 4B:
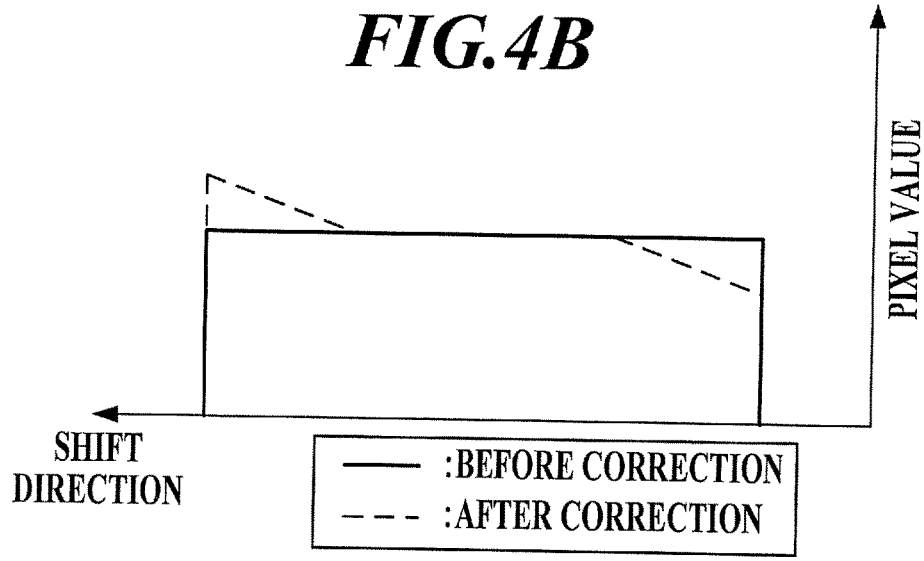
FIG. 4B is a diagram showing a correction example of image data in a counter method according to one or more embodiments.

FIG. 4B shows a correction example of the image data in the counter method according to one or more embodiments. As shown in FIG. 4B, by increasing the pixel value in portions closer to the edge in the front end of the object, and by decreasing the pixel value in portions closer to the edge in the rear end of the object, the density of the object can be corrected to the original density as shown in FIG. 4A.

Figure 5A:
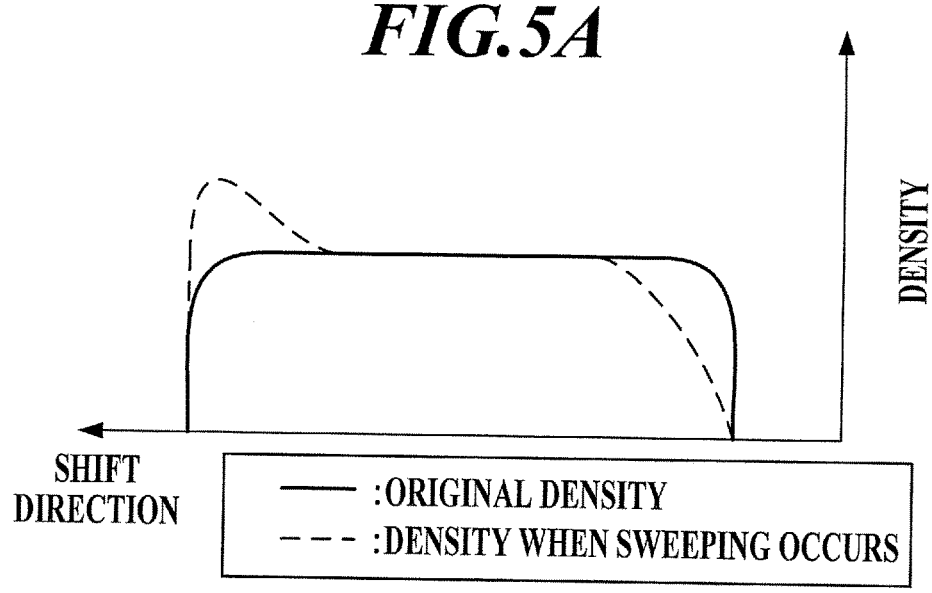
FIG. 5A is a diagram showing a density variation example in a with method according to one or more embodiments.

FIG. 5A shows a density variation example of the object according to the with method in accordance with one or more embodiments. As shown in FIG. 5A a phenomenon opposite of the counter method occurs in the with method. According to the with method, suction occurs in the front end side of the object, and the density drastically increases in portions closer to the edge of the front end. Further, blur occurs in the rear end side of the object, and the density drastically decreases in portions closer to the edge of the rear end.

Figure 5B:
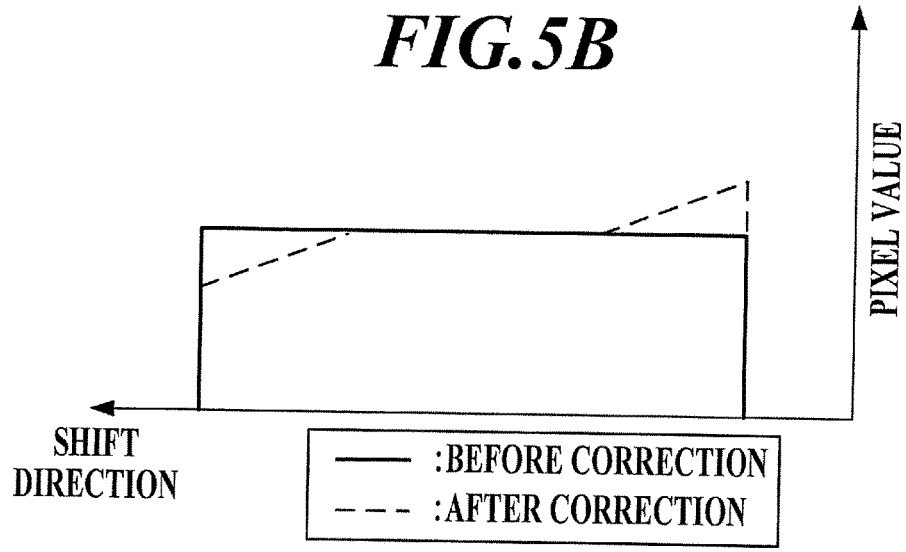
FIG. 5B is a diagram showing a correction example of image data in a with method according to one or more embodiments.

FIG. 5B shows an example of correction of image data in the with method according to one or more embodiments. As shown in FIG. 5B, by decreasing the pixel value of the portions closer to the edge in the front end of the object, and by increasing the pixel value in the portions closer to the edge in the rear end of the object, as shown in FIG. 5A, the density of the object can be corrected to the actual density.

As described above, since the density variation amount is different depending on the developing method, the distance coefficient determiner 13 determines four distance coefficients Dc1, Dc2, Ic1, and Ic2 which control each of the correction amount of the front end and the rear end in the counter method and the with method. The distance of each pixel from the edge of the front end or the rear end corresponds to the count value Cn of the counter 121 or the counter 122. Therefore, the distance coefficients Dc1, Dc2, Ic1, and Ic2 can be determined using the table with the count value Cn of the counter 121 or 122 as the input value, and the distance coefficients Dc1, Dc2, Ic1, and Ic2 as the output value.

Figure 6:
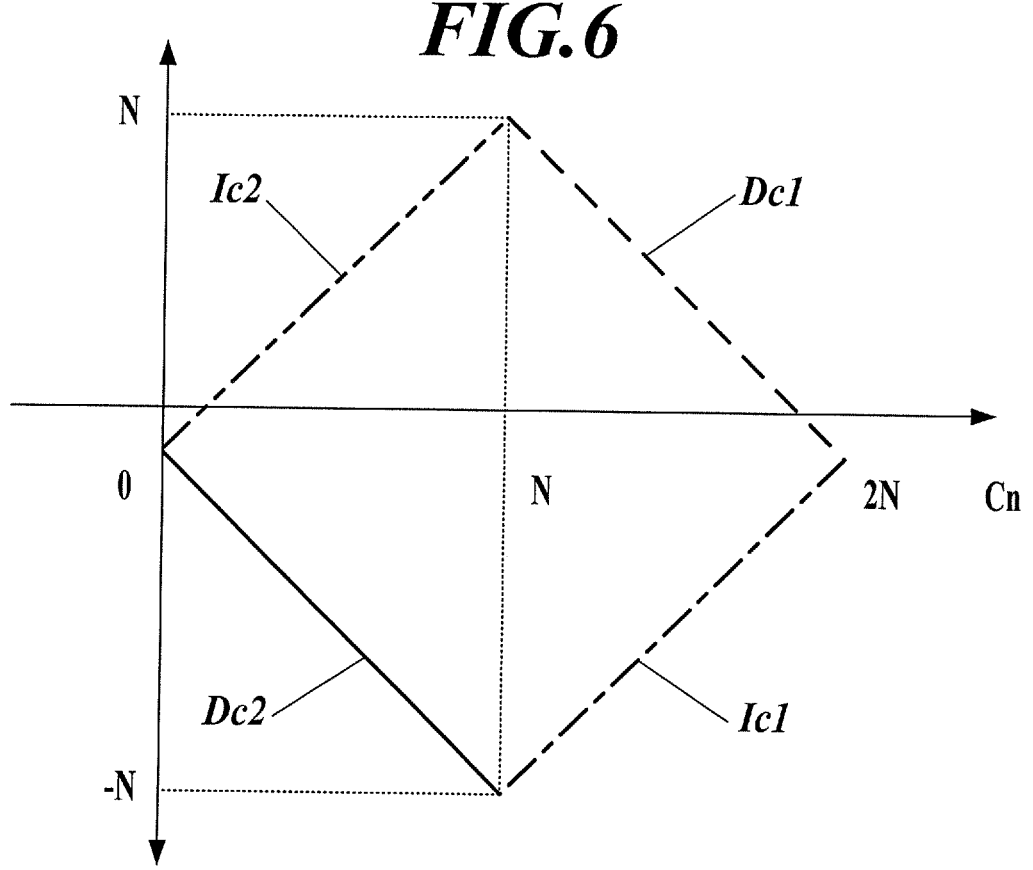
FIG. 6 is a diagram showing an example of a distance coefficient output from a table with a count value according to one or more embodiments.

FIG. 6 shows an example of the distance coefficients Dc1, Dc2, Ic1, and Ic2 output by the table for the count value Cn of the counter 121 or 122 according to one or more embodiments.

The correction target at the front end of the object is pixels from the pixel of the outline of the front end to the pixel N pixels after. The pixel of the outline of the front end is input in the corrector 17 when the image data is shifted N+1 pixels in the sub-scanning direction from the edge detection of the front end, that is, when the count value of the counter 121 is Cn=N+1. The pixel N pixels after the pixel of the outline of the front end is input in the corrector 17 after further being shifted N pixels, that is, when the count value of the counter 121 is Cn=2N. Since the pixel before the pixel of the outline of the front end is outside the correction target, as shown in FIG. 6, the distance coefficient Dc1 and Ic1 of the front end correction is set to Dc1=Ic1=0 when the count value of the counter 121 is between 0 to N.

The distance coefficient Dc1 of the counter method is set to monotonically decrease from N to 0 when the count value Cn of the counter 121 is between N+1 to 2N. According to such distance coefficient Dc1, the correction value can be controlled so that the pixel value increases as the distance from the edge of the front end becomes shorter in the counter method where the density decreases closer to the front end edge. Alternatively, the distance coefficient Ic1 of the with method is set so that −N to 0 monotonically increases when the counter value Cn of the counter 121 is between N+1 to 2N. According to such distance coefficient Ic1, the correction value can be controlled so that the pixel value decreases as the distance from the edge of the front end becomes shorter in the with method where the density increases closer to the front end edge.

The correction target at the rear end of the object is pixels from the pixel of the outline of the rear end to the pixel N pixels before. The pixel N pixels before from the rear end of the object is input in the corrector 17 when the image data is shifted 1 pixel from the edge detection of the rear end in the sub-scanning direction, that is, when the count value of the counter 122 is Cn=1. The outline pixel is input when further shifted N pixels, that is, when the count value is Cn=N. After the outline pixel, that is, after Cn=N+1 is outside the target of correction. Therefore, as shown in FIG. 6, the distance coefficients Dc2 and Ic2 for the rear end correction is set to Dc2=Ic2=0 when the count value Cn of the counter 122 is between N+1 to 2N.

The distance coefficient Dc2 of the counter method is set to monotonically decrease from 0 to −N when the count value Cn of the counter 122 is between 0 to N. According to such distance coefficient Dc2, the correction value can be controlled so that the pixel value reduces as the distance from the edge of the rear end becomes shorter in the counter method where the density increases close to the rear end edge. Alternatively, the distance coefficient Ic2 of the with method is set so as to monotonically increase from 0 to N when the count value of the counter 122 is between 0 to N. According to such distance coefficient Ic2, the correction value can be controlled so that the pixel value increases as the distance from the edge of the rear end becomes shorter in the with method where the density decreases close to the rear end edge.

The correction coefficient outputting unit 14 calculates the correction coefficient gap 1 which controls the correction amount of the front end side of the object and the correction coefficient gap 2 which controls the correction amount of the rear end side of the object and outputs the result.

As shown in FIG. 1, in one or more embodiments, the correction coefficient outputting unit 14 includes an edge strength determiner 141, a density coefficient determiner 142, a line width coefficient determiner 143, and a calculator 144.

[Edge Strength]

The edge strength determiner 141 determines the edge strength abs of each of the front end and the rear end detected by the detector 11.

Specifically, the edge strength detector 141 uses the pixel values Pm0 and Pm3 which are the target pixel and the pixel 3 pixels before the target pixel when the edge of the front end or the rear end is detected by the detector 11 and calculates the edge strength abs of the front end or the rear end by the following formula.

$$abs=|Pm0-Pm3|$$

[Density Coefficient]

In one or more embodiments, the density coefficient determiner 142 is determined by the density determiner ATD of each of the front end and the rear end of the object according to the pixel value of the object in which the front end or the rear end is detected.

Even if the toner is swept, the variation in density is small when the object has a density near the maximum density or the minimum density. The density largely varies in the object with an intermediate density, and the image quality greatly deteriorates which stands out. To cope with such tendency, the correction value can be controlled by the density coefficient ATD so that the correction amount is small in the density range where the density variation due to sweeping is small, and the correction amount is large in the density range where the density variation is large.

Figure 7:
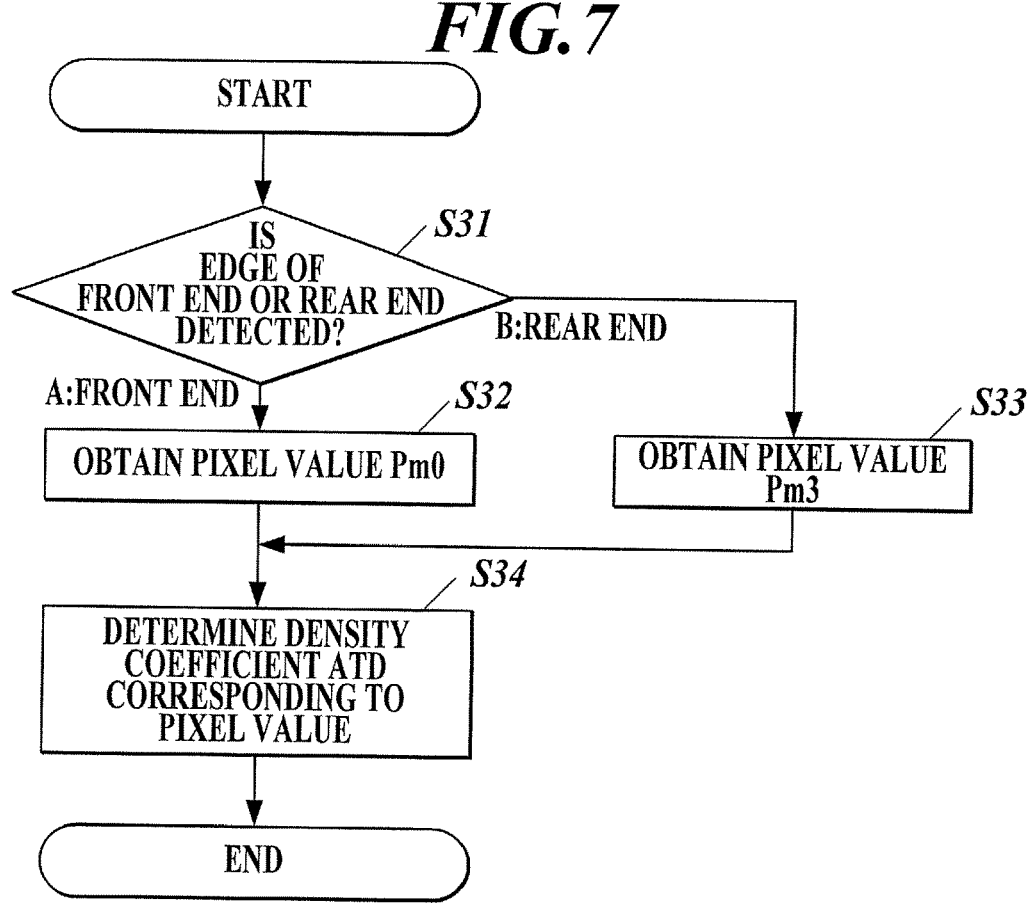
FIG. 7 is a flowchart showing a process order when a density coefficient is determined according to one or more embodiments.

FIG. 7 shows the process order of the density coefficient determiner 142 according to one or more embodiments.

As shown in FIG. 7, when the edge of the front end is detected by the detector 11 and the flag Ed1 is output (step S31: A), the density coefficient determiner 142 obtains the pixel value Pm0 of the target pixel as the pixel value of the object (step S32). When the rear end edge is detected by the detector 11 and the flag Ed2 is output (step S31: B), the density coefficient determiner 142 obtains the pixel value Pm3 of the pixel 3 pixels before the target pixel as the pixel value of the object (step S33).

The density determiner 142 determines the density coefficient ATD corresponding to the obtained pixel value (step S34). The density coefficient ATD can be determined using the table with the pixel value of the object as the input value and the density coefficient ATD as the output value.

Figure 8:
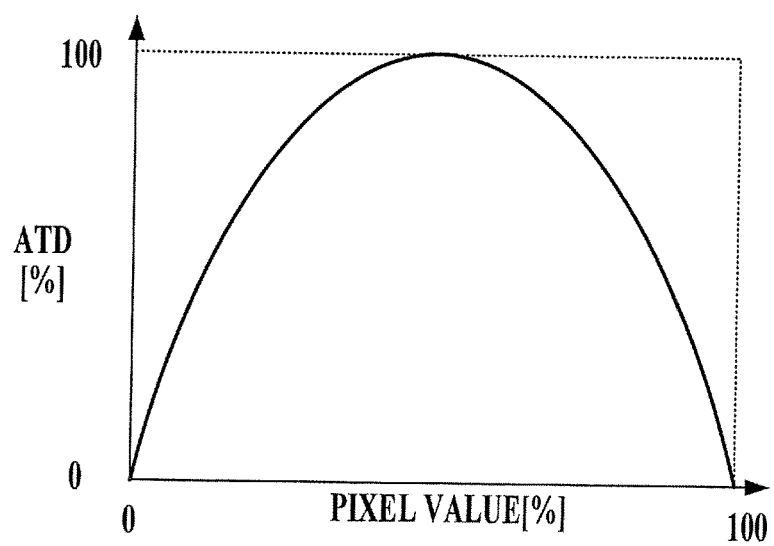
FIG. 8 is a diagram showing an example of a density coefficient output from a table with respect to a pixel value of an object according to one or more embodiments.

FIG. 8 shows an example of the density coefficient ATD [%] output from the table with relation to the pixel value [%] of the object according to one or more embodiments. The pixel value is shown as the percentage with relation to the maximum value. For example, the pixel value 128 of the 8-bit image data is shown as 50% which is the percentage of 128 with relation to the maximum value 255.

As shown in FIG. 8, the input value and the output value is determined so that the density coefficient ATD is output to be small when the pixel value of the object is near 0% and 100%, and the density coefficient ATD is output to be large when the pixel value of the object is near 50%.

[Line Width Coefficient]

The line width coefficient determiner 143 determines the line width coefficient ATW according to the number of pixels from the edge of the front end to the edge of the rear end.

The density variation due to sweeping of the toner does not stand out as the line width in the sub-scanning direction becomes shorter. According to this tendency, the correction value by the line width coefficient ATW can be controlled so that the correction amount becomes small as the line width becomes shorter.

Figure 9:
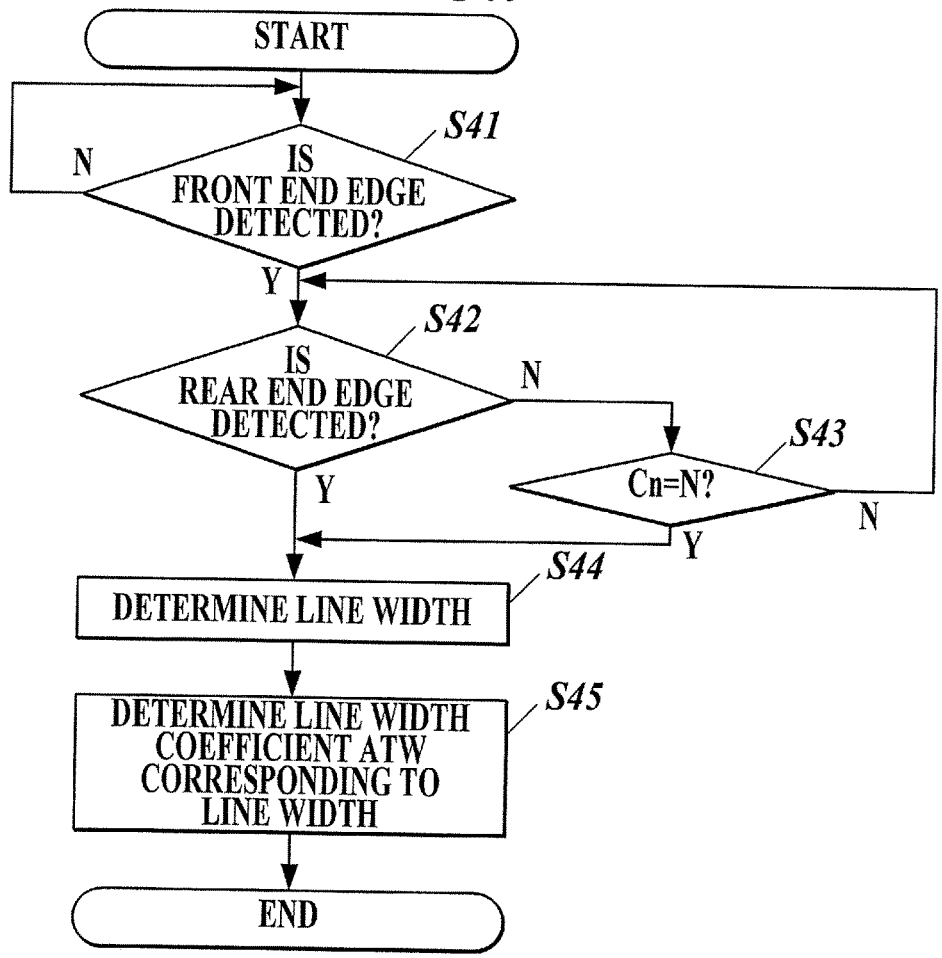
FIG. 9 is a flowchart showing a process order when a line width coefficient is determined according to one or more embodiments.

FIG. 9 shows a process order of the line width determiner 143 according to one or more embodiments.

As shown in FIG. 9, when the detector 11 detects the edge of the front end (step S41: Y), and further detects the edge of the rear end (step S42: Y), the line width coefficient determiner 143 determines the number of pixels from the edge of the front end to the edge of the rear end as the line width (step S44).

The counter 121 counts the number of pixels shifted from the edge detection of the front end. The number of pixels from the edge of the front end to the edge of the rear end is equal to the count value Cn of the counter 121 when the edge of the rear end is detected. Therefore, the line width coefficient determiner 143 may obtain the count value Cn as the line width. When the upper limit of the line width is N pixels, the edge of the rear end is not detected (step S42: N), and the count value Cn reaches N (step S43: Y), the line width coefficient determiner 143 determines the line width as N pixels (step S44).

Next, the line width coefficient determiner 143 determines the line width coefficient ATW corresponding to the line width (step S45). The line width coefficient ATW can be determined using the table in which the line width is the input value and the line width coefficient ATW is the output value.

Figure 10:
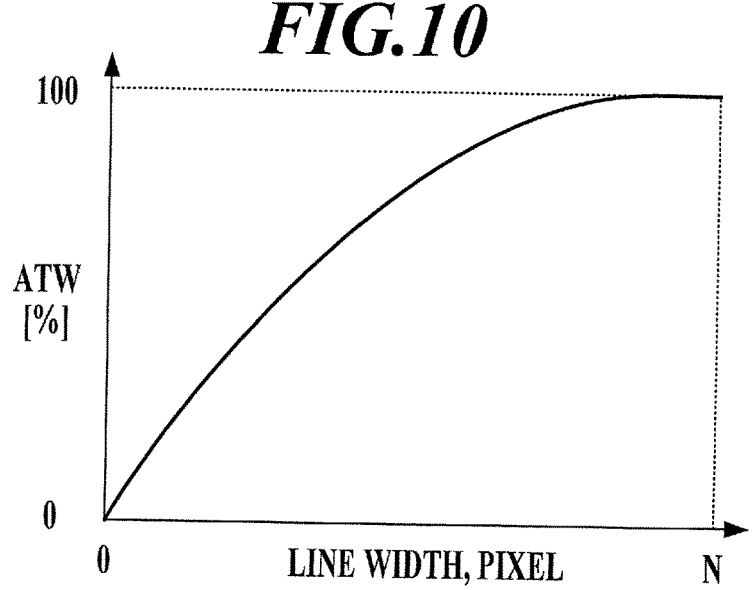
FIG. 10 is a diagram showing an example of a line width coefficient output from a table with respect to a line width according to one or more embodiments.

FIG. 10 shows one example of the line width coefficient ATW [%] output from the table with relation to the line width [number of pixels] according to one or more embodiments.

As shown in FIG. 10, the input value and the output value are determined so that a small line width coefficient ATW is output as the line width becomes shorter.

[Correction Coefficient]

In one or more embodiments, the calculator 144 uses the edge strength abs, density coefficient ATD, and the line width coefficient ATW determined for each of the front and the rear end of the object to calculate the correction coefficient gap1 for the front end and the correction coefficient gap2 for the rear end by the following formula.

$$gap1 = gap2$$
$$= abs \times DIV \times ATD \times ATW$$

According to the above formula, a specific coefficient DIV is a fixed value which can be set for each image forming apparatus, and can actually be determined freely according to the toner amount used for forming the image in each image forming apparatus. Even if the same image is formed, if the toner amount for an object is different depending on the image forming apparatus, the correction amount can be controlled according to the characteristics of each image forming apparatus by using the specific coefficient DIV. The specific coefficient DIV can be common for both the front end and the rear end. Alternatively, for situations in which the toner amount is different in the front end and the rear end, the specific coefficient DIV can be prepared for each of the front end and the rear end, and this can be used for calculating each of the correction coefficient gap 1 and the correction coefficient gap 2.

The line memory 15 holds the count value Cn of the counters 121 and 122, and the correction coefficients gaps 1 and gap 2 of each pixel output by the correction coefficient output unit 14.

The count value Cn held by the line memory 15 is read out when the line width coefficient and the distance coefficient are determined, and used for calculating the correction value. After the correction value is calculated, the count value Cn incremented in the counters 121 and 122 is held in the line memory 15 again. The held count value Cn is used for calculating the correction value of the next pixel. Meanwhile, when the edge is detected and the count value Cn of the counters 121 and 122 is reset, the count value Cn held in the line memory 15 is also reset.

When the correction coefficients gap1 and gap2 are calculated, the edge strength abs and the density coefficient ATD are determined when the edge of the front end and the rear end is detected, but the line width coefficient ATW is determined when the edge of the rear end is detected or when the count value Cn of the counter 121 reaches N=15. The calculator 144 first holds the result of multiplying the edge strength abs and the density coefficient ATD determined in advance in the line memory 15 as the correction coefficients gap1 and gap2, multiplies the line width coefficient ATW to the held gap1 and gap2 at the point when the line width coefficient ATW is determined, and this is held in the line memory 15 again.

The line memory 15 can be a size which holds the correction coefficients gap1 and gap2 for each pixel of the image data with at least N pixels in the sub-scanning direction, and can be a page memory which holds data for 1 page.

The correction value calculator 16 calculates the correction values CR1 and CR2 for the density variation due to sweeping of the toner by using the distance coefficients Dc1, Dc2, Ic1, and Ic2 of each pixel determined by the distance coefficient determiner 13 and the correction coefficients gap1 and gap2 of each pixel calculated by the correction coefficient outputting unit 14 and held in the line memory 15.

When the development method is the counter method, the correction value CR1 of the front end side and the correction value CR2 of the rear end side can be calculated by the following formula.

$CR1 = Dc1 \times gap1$ $CR2 = Dc2 \times gap2$

When the development method is the with method, the correction value CR1 of the front end side and the correction value CR2 of the rear end side can be calculated by the following formula.

$CR1 = Ic1 \times gap1$ $CR2 = Ic2 \times gap2$

The corrector 17 adds the correction values CR1 and CR2 in each pixel calculated by the correction value calculator 16 to the pixel value of each pixel in M×1 pixels output shifting 1 pixel at a time in the sub-scanning direction from the pipeline processor 10 and outputs the corrected pixel. When the original pixel value of the correction target pixel is represented as Pin and the corrected pixel value is represented as Pout, the corrected pixel value Pout can be represented by the following formula.

$Pout = Pin + CR1 + CR2$

Figure 11A:
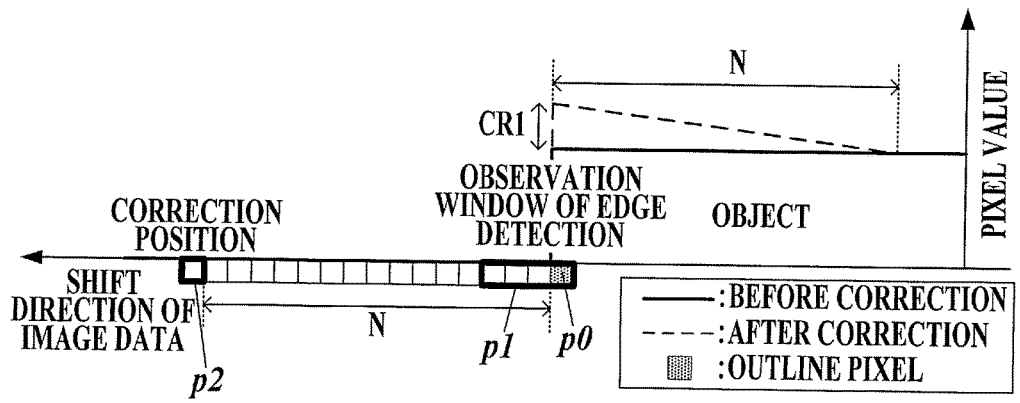
FIG. 11A is a diagram showing image data of a front end of an object when an edge is detected according to one or more embodiments.
Figure 11B:
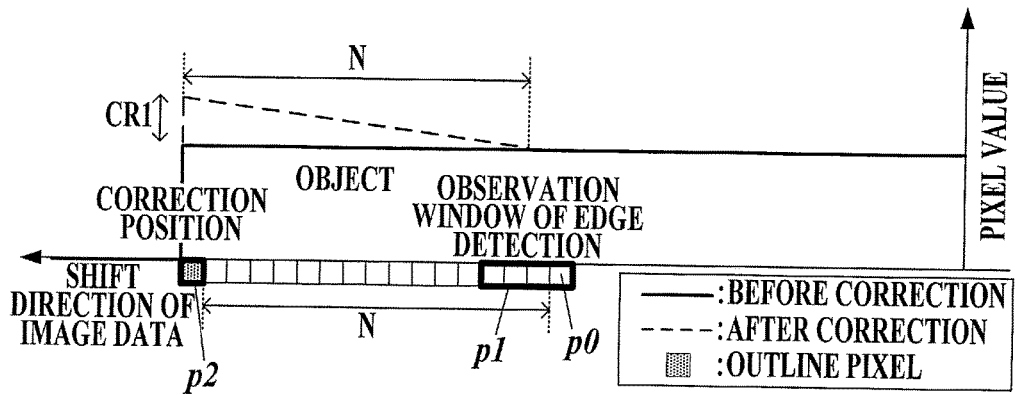
FIG. 11B is a diagram showing image data of a front end of an object when shifted N+1 pixels from when an edge is detected according to one or more embodiments.

FIG. 11A and FIG. 11B show examples of correcting image data in a front end of an object according to one or more embodiments.

As shown in FIG. 11A, the correction position p2 in which the correction value is added by the corrector 17 is a position in which the image data is shifted N+1 pixels in the sub-scanning direction from the position (position of target pixel p0) where each pixel is input in the observation window p1 for edge detection by the detector 11. When the image data of the front end of the object is input in the observation window p1, the detector 11 detects the edge of the front end between the target pixel p0 input in the observation window p1 and the pixel 1 pixel before the above. Here, the target pixel p0 is the outline pixel of the front end of the object. When the blur occurs in the front end, the correction value calculator 16 calculates the correction value CR1 of each pixel so that the pixel value increases in the outline pixel in the front end and N pixels after the outline pixel. Since the correction position p2 of the corrector 17 is N pixels apart from the position of the target pixel p0 in the observation window p1, as shown in FIG. 11B, when the outline pixel of the front end input in the observation window p1 shifts N+1 pixels, the correction in the corrector 17 starts, and when the pixel N pixels after the outline pixel is corrected, the correction of the front end ends.

Figure 12A:
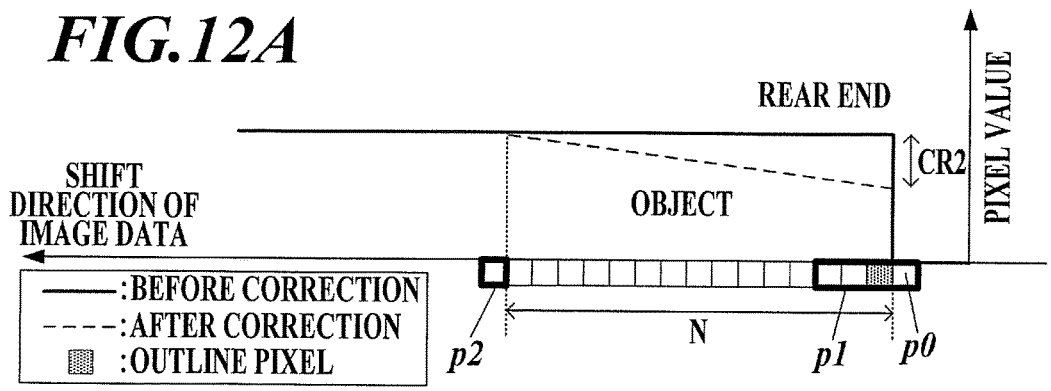
FIG. 12A is a diagram showing image data of a rear end of an object when an edge is detected according to one or more embodiments.
Figure 12B:
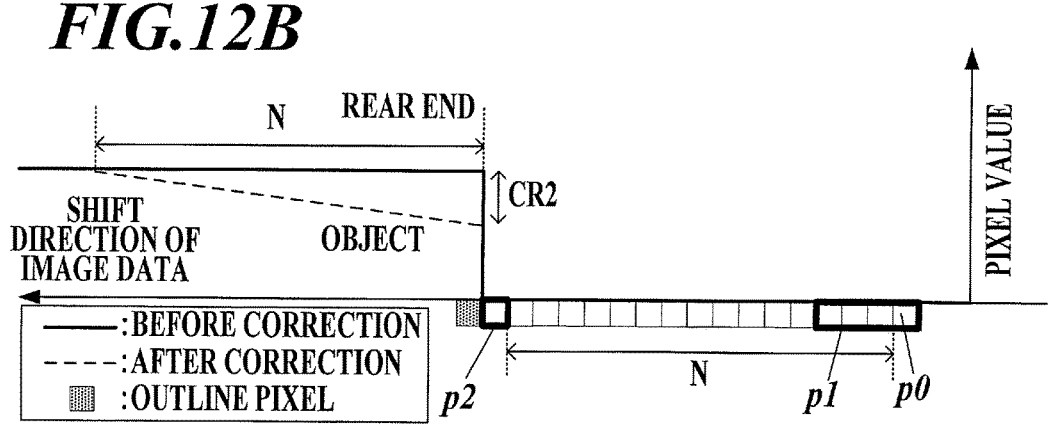
FIG. 12B is a diagram showing image data of a rear end of an object when shifted N+1 pixels from when an edge is detected according to one or more embodiments.

FIG. 12A and FIG. 12B show examples of correcting image data in a rear end of an object according to one or more embodiments.

As shown in FIG. 12A, when the image data of the rear end of the object is input in the observation window p1 of the edge detection, the edge of the rear end is detected between the target pixel p0 input in the observation window p1 and 1 pixel before. Here, the target pixel p0 is the pixel of the background adjacent to the outline pixel in the rear end of the object. When sweeping occurs in the rear end, the correction value calculator 16 calculates the correction value CR2 of each pixel in the outline pixel of the rear end and N pixels before the outline pixel so that the pixel value decreases. When the image data shifts 1 pixel and the pixel N pixels before the outline pixel of the rear end is positioned in the correction position p2, the correction of the rear end starts, and correction is performed from this pixel to the outline pixel. When the correction of the outline pixel ends and further shifts 1 pixel, that is, when shifted N+1 pixels from the edge detection, as shown in FIG. 12B, the correction of the rear end ends.

The corrector 17 is able to switch whether to add the correction value to each pixel according to the attribute of each pixel determined by the attribute determiner 19.

For example, the corrector 17 is able to determine that the pixel with an attribute as a photograph is not the correction target and the pixel with the attribute as the character or figure is the correction target. The image region of the photograph may be processed with the low pass filter to remove the noise and the difference in the contrast between the object and the background may be unclear. Therefore, it may be difficult to detect the edge of the photograph. Further, there are few regions in which the density of the object is smooth, and the variation in density due to sweeping of toner hardly stands out. The effect of correction becomes small. Rather, unintended variation in density may occur due to the correction, and new deterioration in the pixel quality may be prevented by setting the pixel with the attribute as the photograph outside the correction target.

In one or more embodiments, the averaging processor 18 inputs image data after correction output from the corrector 17 and original data before correction output from the pipeline processor 10. The averaging processor 18 performs weighted averaging of the pixel value in each pixel in the corrected image data if the pixel value of each pixel adjacent in the original data in the main scanning direction is the same.

The corrector 17 corrects the pixel value of each pixel in the sub-scanning direction so as to change step by step. Such correction is correction individual in each pixel in the main scanning direction. Therefore, the density change in the main scanning direction may not be continuous and this may cause streaky noise. Since the averaging processor 18 performs weighted averaging as described above, the pixel value changes smoothly in the main scanning direction. With this, the noise caused by correction can be suppressed.

Figure 13:
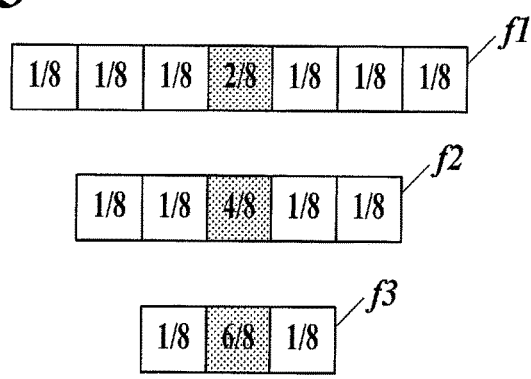
FIG. 13 is a diagram showing an example of a filter used in an averaging process according to one or more embodiments.

A filter can be used in the weighted averaging. FIG. 13 shows an example of a filter. The averaging processor 18 uses a filter f1 with 7×1 pixels to compare the pixel values of 7 pixels adjacent in the main scanning direction among the pixels. If the pixel values are the same, weighted averaging is performed on each pixel. If the pixel values are not the same, the averaging processor 18 uses a filter f2 with 5×1 pixels to compare the pixel values of 5 pixels adjacent in the main scanning direction. If the pixel values are the same, weighted averaging is performed on each pixel. If the pixel values are not the same, the averaging processor 18 uses a filter f3 with 3×1 pixels to compare the pixel values of 3 pixels adjacent in the main scanning direction. If the pixel values are the same, the weighted averaging is performed, and if it is not the same, the averaging process is not performed and the original pixel value is output.

Each filter f1 to f3 includes a set of a plurality of weighting coefficients set in each pixel of the filter and the set of weighting coefficients can be switched.

For example, the filter f3 may include as the weighting coefficients for each pixel in 3×1 pixels a set including (1/8, 6/8, 1/8) and a set including (2/8, 4/8, 2/8), and the set of weighting coefficients can be switched.

Figure 14:
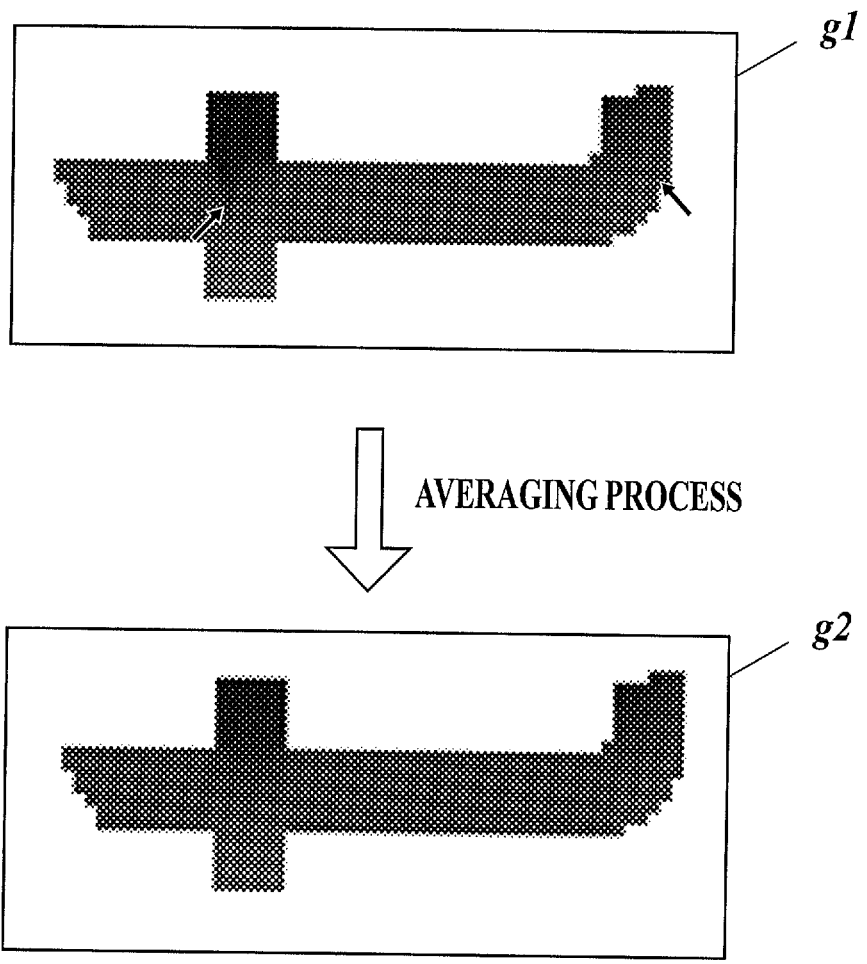
FIG. 14 is a diagram showing an image example before and after an averaging process according to one or more embodiments.

FIG. 14 shows an example of an image before and after the averaging process according to one or more embodiments.

As shown in FIG. 14, the density in the main scanning direction in the image g1 after correction is discontinuous and streaky noise can be seen in the portion shown with an arrow in FIG. 14. Turning to the image g2 after the averaging process, the variation in the density in the main scanning direction is smooth and the noise is solved.

[Attribute Determination]

In one or more embodiments, the attribute determiner 19 inputs the attribute data attached to the image data, determines the attribute of the pixels of the image data and outputs the flag showing the determined attribute.

The attribute data can be generated when the data describing the contents of the image to be formed in a page description language (PDL) (hereinafter referred to as PDL data) is rasterized or can be generated when the image data is analyzed. For example, when the data is generated in the rasterizing process, the attribute of pixels in the image such as the Kana letters (Japanese alphabet), English alphabet, numerals, etc. which are drawn according to the description of the character code in the data described in the PDL can be determined to be Text. The attribute of the pixels in the image such as a polygon, circle, ruled line which are drawn according to the description in a vector format such as DXF, SVG, WMF, etc. can be determined to be Graphics. The attribute of the image such as a photograph which is drawn according to the file in the JPEG format can be determined to be Image. The attribute data generated as described above can be input with the image data.

As described above, the image processing apparatus 1 includes the following. The pipeline processor 10 inputs the image data while shifting each pixel 1 pixel at a time in the sub-scanning direction, performs various types of image processes and outputs the result. The detector 11 inputs and holds pixels of the image data input in the pipeline processor 10 in a unit of a plurality of pixels in the sub-scanning direction including the above pixels and compares the held pixels with the pixel values to detect the edge of the front end or the rear end of the object. The counters 121 and 122 count the number of pixels that the pixels of the image data shifted in the sub-scanning direction after the detector 11 detects the edge of the front end or the rear end. The distance determiner 14 determines the distance coefficient which adjusts the pixel value of each pixel in the object within the range of N pixels from the edge of the front end or the rear end using the count value of the counters 121 and 122 according to the distance from the edge of the front end or the rear end. The correction value calculator 15 calculates the correction value of each pixel in the object using the distance coefficient determined by the distance coefficient determiner 14. The corrector 17 adds the correction value of each pixel calculated by the correction value calculator 15 to the pixel value of each pixel of the image data output from the pipeline processor 10 shifted 1 pixel at a time in the sub-scanning direction. The position where the corrector 17 adds the correction value is the position shifted at least N+1 pixels from the position in which each pixel is input in the detector 11.

According to one or more embodiments described above, the correction value is simply added to the pixel value of each pixel in the position shifted N+1 pixels from the position where each pixel is input in the detector 11 with the image region of N pixels from the edge of the front end or the rear end as the correction target. Therefore, there is no need to observe the image region of the correction target. Further, there is no need to observe both the front end and the rear end at the same time in the edge detection. That is, the observation window necessary to correct the density variation due to sweeping is satisfied by only a few pixels necessary to detect the edge of the front end or the rear end. Therefore, it is possible to greatly reduce the memory amount used in correction of the image data in the pipeline process. With this, the circuit scale can be suppressed and the costs can be reduced.

[Image Forming Apparatus]

The above-described image processing apparatus 1 can be loaded on the image forming apparatus.

Figure 15:
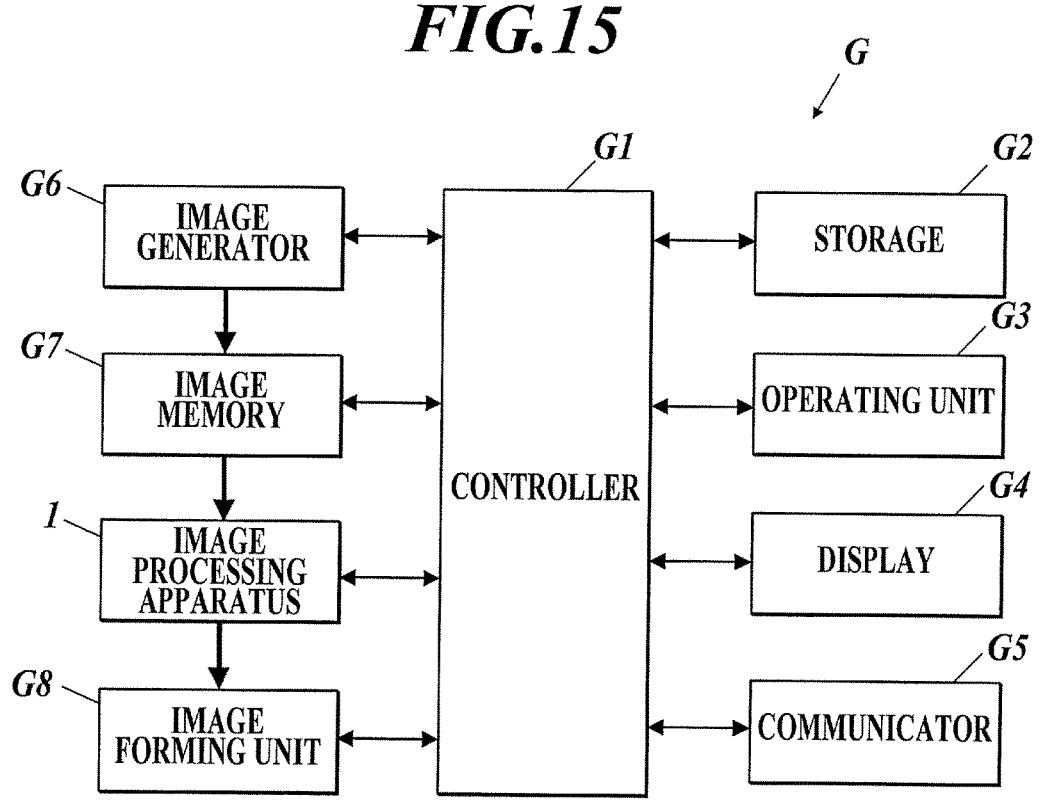
FIG. 15 is a block diagram showing a configuration of an image forming apparatus according to function according to one or more embodiments of the present invention.

FIG. 15 shows a configuration of an image forming apparatus G according to one or more embodiments of the present invention according to function.

As shown in FIG. 15, the image forming apparatus G includes, a controller G1, a storage G2, an operating unit G3, a display G4, a communicator G5, an image generator G6, an image memory G7, an image processing apparatus 1, and an image forming unit G8.

In one or more embodiments, the controller G1 includes a CPU (Central Processing Unit), a RAM (Random Access Memory), and the like. The controller G1 reads various programs from the storage G2 and executes the programs to control each unit of the apparatus.

For example, the controller G1 controls the image processing apparatus 1 to process image data generated by the image generator G6 and held in the image memory G7. Then, the controller G1 controls the image forming unit G8 to form the image on the sheet based on the image data after image processing.

The storage G2 stores the program readable by the controller G1 and the file used when the program is executed. As the storage G2, a large capacity memory such as a hard disk is used.

The operating unit G3 generates the operating signal according to the user operation and outputs the signal to the controller G1. As the operating unit G3, the keypad, the touch panel including the display G4 as one can be used.

The display G4 displays the operation screen according to the instruction by the controller G1. As the display G4, an LCD (Liquid Crystal Display), an OELD (Organic Electro Luminescence Display), etc. can be used.

The communicator G5 communicates with the external apparatus on the network such as a user terminal, a server, another image forming apparatus or the like.

The communicator G5 receives the PDL data through the network from the user terminal, etc.

The image generator G6 rasterizes the PDL data received by the communicator G5 and generates image data in a bitmap format. In the image data, each pixel includes the pixel value of four colors, specifically, cyan (C), magenta (M), yellow (Y), and black (K).

The image memory G7 is a buffer memory which temporarily holds image data generated in the image generating unit G6. As the image memory G7, a DRAM (dynamic RAM), etc. can be used.

The image processing apparatus 1 reads the image data from the image memory G7 and performs various image processes.

The image forming unit G8 forms an image including four colors of C, M, Y, and K on the sheet by electrophotography based on the image data on which image processing is performed by the image processing apparatus 1.

Specifically, the image forming unit G8 includes four writing units and intermediate transfer belts to which toner is supplied and the image is developed by the developing sleeve after the charged photoreceptor is scanned with a beam of light emitted by the light scanning apparatus and an electrostatic latent image is formed based on the image data. The image forming unit G8 forms images for each color of C, M, Y, and K on the photoreceptor of the four writing units and after the images are sequentially overlapped and transferred on the intermediate transfer belt (primary transfer), the images are further transferred on the sheet (secondary transfer). Heat and pressure are applied with the fixing apparatus on the sheet after transfer to fix the toner.

Figure 16:
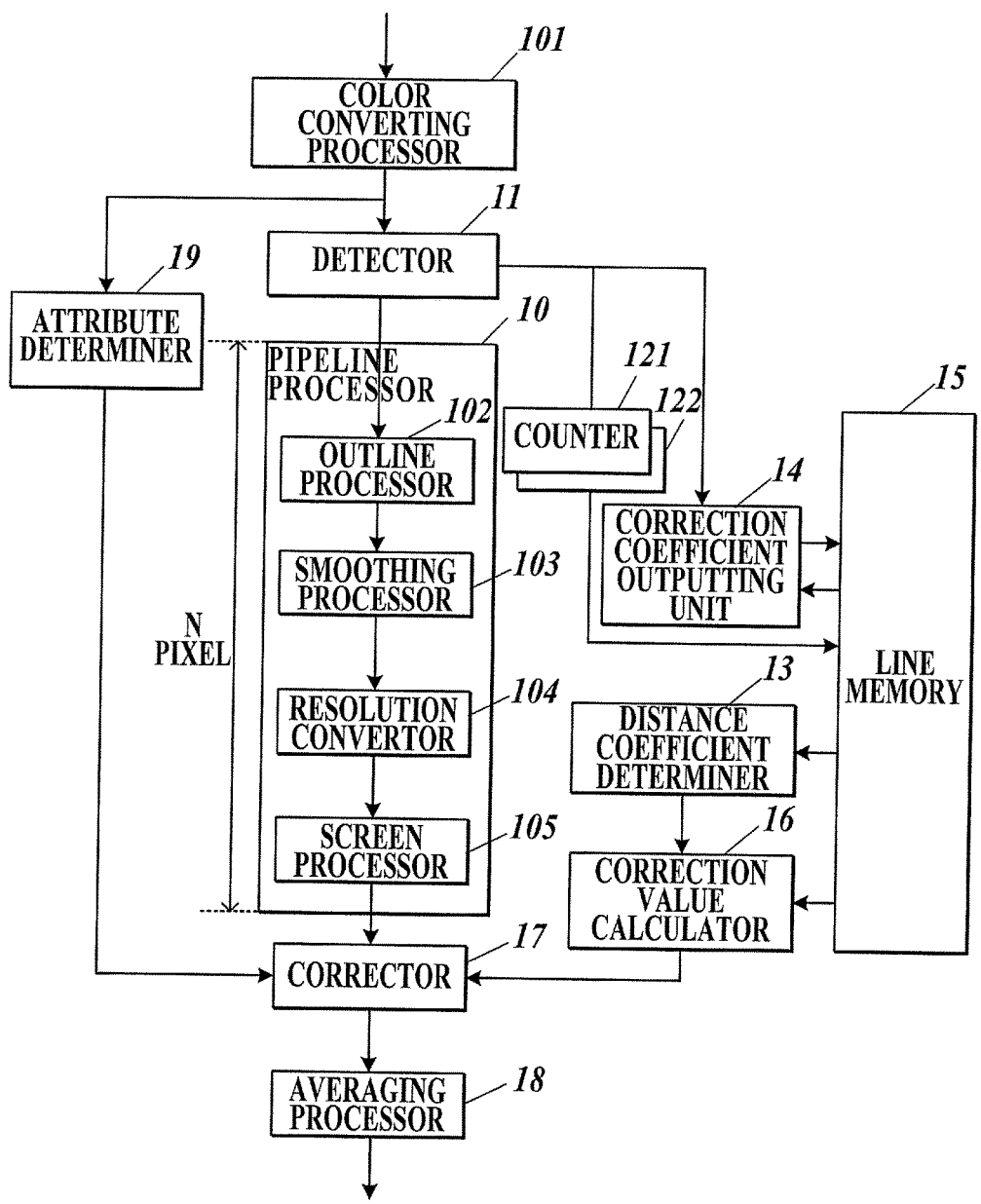
FIG. 16 is a block diagram showing a configuration of an image processing apparatus according to function when mounted in an image forming apparatus in accordance with one or more embodiments.
Figure 19:
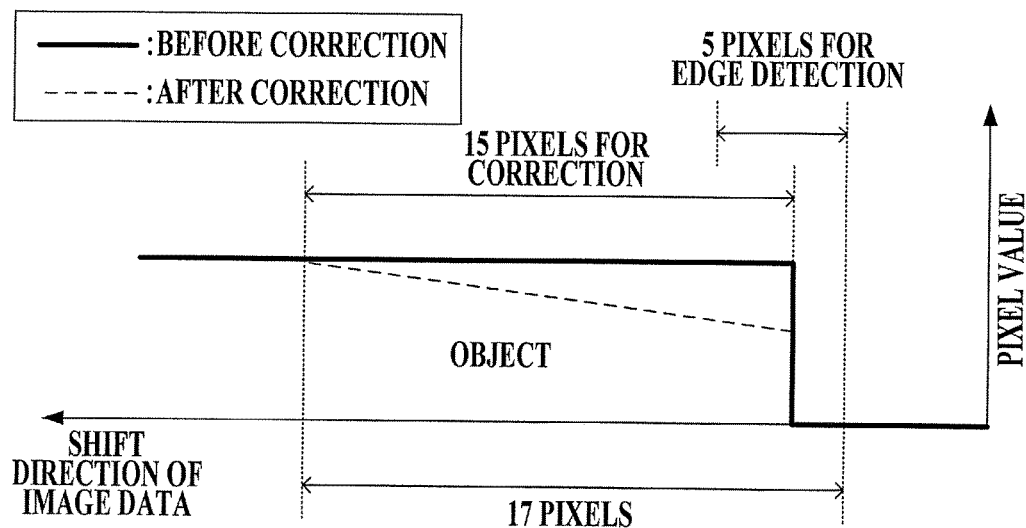
FIG. 19 is a diagram showing a conventional observation window necessary for correction of sweeping.

FIG. 16 shows the configuration of the image processing apparatus 1 according to function when mounted on the image forming apparatus G in accordance with one or more embodiments.

As shown in FIG. 16, the image processing apparatus 1 has the same configuration as the configuration shown in FIG. 1 with the exception of the following. The image processing apparatus 1 includes a color conversion processor 101, and as the image processing elements of the pipeline processor 10, an outline emphasizer 102, a smoothing processor 103, a resolution converter 104, and a screen processor 105.

The color conversion processor 101 performs a color conversion process for color management. The outline emphasizer 102 performs an outline emphasizing process to adjust the pixel value in the outline pixels of the object so that the outline of the object is emphasized. The smoothing processor 103 performs a smoothing process to adjust the pixel value in the outline pixels of the object and the pixels of the background adjacent to the outline pixel so that the roughness around the edge of the object is reduced. The resolution converter 104 converts the resolution of the image data. The screen processor 105 performs the screen process for pseudo reproduction of the halftone.

As described above, when a plurality of types of image processing elements for emphasizing image quality are connected by the pipeline process, the detecting unit 11 inputs the image data before the pipe line process in a unit of a few pixels while shifting 1 pixel at a time in the sub-scanning direction to detect the edge and the corrector 17 corrects each pixel shifted N+1 pixels after the pipeline process, that is, the edge detection. As described above, there is no need to observe the image region for edge detection and the image region of the correction target at the same time. Further, the observation window necessary for correction of the density variation due to sweeping of the toner is satisfied by only a few pixels for edge detection. Therefore, the memory capacity used for correction of the image data on which pipeline process is performed can be reduced.

[Image Forming System]

An image forming system including an image forming apparatus can also similarly include the above-described image processing apparatus 1. The image forming system may have any structure as long as an image forming apparatus is provided. For example, the structure may be provided with a plurality of image forming apparatuses connected by a conveying path, a plurality of image forming apparatuses connected through a network, an image processing apparatus and an image forming apparatus, an image forming apparatus and a server, or the like.

FIG. 17 shows an example of an image forming system provided with a plurality of image forming apparatuses G and a server J according to one or more embodiments. As shown in FIG. 17, each image forming apparatus G is connected to the server J through the network M.

According to the image forming system G10, the above-described processing elements for correction of the variation of density due to sweeping, that is, the detector 11, the distance coefficient determiner 13, the correction coefficient outputting unit 14, the correction value calculator 16, the corrector 17, and the like can be distributed among the image forming apparatuses and the server.

One or more embodiments described above provide suitable examples of the present invention and the present invention is not limited to the above. The present invention can be suitably changed without leaving the scope of the present invention.

For example, according to one or more embodiments described above, the size of the pipeline processor 10 in the sub-scanning direction is the size with N pixels which is the same as the image region in which correction of sweeping is performed. With this, the correction position in which the corrector 17 adds the correction value is the position shifted N+1 pixels from the position where each pixel is input in the detector 11. However, correction is possible if the correction position is at least the position shifted N+1 pixels. Therefore, the correction position can be a position shifted more than N+1 pixels according to the size of the pipeline processor 10 in the sub-scanning direction. For example, if the size of the pipeline processor 10 in the sub-scanning direction is 2N, the correction position can be the position shifted 2N+1 pixels from the position where each pixel is input in the detector 11.

The density variation varies greatly according to the distance from the edge. Therefore, if the correction value is calculated using at least the distance coefficient, the correction value can be calculated without using the correction coefficient. However, if the correction value is calculated using the correction coefficient as described above, it is possible to cope with density variation such as the contrast near the edge, the object density and length of line width. Therefore, using the correction coefficient is preferable in order to enhance the accuracy of correction. Regarding the correction coefficient, it is preferable to use all of the edge strength, the density coefficient and the line width coefficient in order to enhance the correction accuracy. Alternatively, one or two among the above can be combined and used in the calculation.

For example, when the circuit configuration is simplified, the correction value can be calculated by only the distance coefficient which greatly influences the density variation. Further, when the object density and the length of the line width are considered, the correction coefficient can be calculated using the density coefficient and the line width coefficient, and the correction value can be calculated using the distance coefficient and the calculated correction coefficient.

Although the disclosure has been described with respect to only a limited number of embodiments, those skilled in the art, having benefit of this disclosure, will appreciate that various other embodiments may be revised without departing from the scope of the present invention. Accordingly, the scope of the invention should be limited only by the attached claims.

What is claimed is:

1. An image processing apparatus comprising:
   a first memory;
   a second memory; and
   a controller that:
      inputs in the first memory image data shifted 1 pixel at a time in a sub-scanning direction;
      executes a plurality of types of image processes;
      outputs a result;
      inputs and holds in the second memory each pixel of the image data input in the first memory in a unit of a plurality of pixels in the sub-scanning direction;
      compares each pixel value of the held plurality of pixels;
      detects an edge of a front end or a rear end of an object;
      counts a number of pixels that each pixel of the image data shifted in the sub-scanning direction from when the edge of the front end or the rear end is detected;
      uses a counted value to determine a distance coefficient to adjust the pixel value of each pixel of the object in a range of N pixels from the edge of the front end or the rear end according to a distance from the edge of the front end or the rear end;
      calculates a correction value of each pixel of the object using the distance coefficient; and
      adds the correction value of each pixel to the pixel value of each pixel of the image data output shifted 1 pixel at a time in the sub-scanning direction from the first memory and corrects the image data based on the correction value,
   wherein, a position where the correction value is added is a position shifted at least N+1 pixels from a position where each pixel is input to the second memory, and
   wherein the image processing apparatus causes an image forming apparatus to print the corrected image data.

2. The image processing apparatus according to claim 1, wherein,
   the controller further:
      determines edge strength of the edge of the front end or the rear end;
      determines a density coefficient according to the pixel value of the object in which the edge of the front end or the rear end is detected;
      determines a line width coefficient according to a number of pixels from the edge of the front end to the edge of the rear end;
      calculates a correction coefficient using at least one of the edge strength, the density coefficient, and the line width coefficient; and
      uses the distance coefficient and the correction coefficient to calculate the correction value.

3. The image processing apparatus according to claim 2, further comprising:
   a third memory which holds the correction coefficient of each pixel in the image data and the counted value.

4. The image processing apparatus according to claim 1, wherein the controller executes weighted averaging of the pixel value after correction for each pixel when an original pixel value of each pixel adjacent in a main scanning direction of the image data is same.

5. The image processing apparatus according to claim 1, wherein
   the controller further:
      determines an attribute of each pixel of the image data shown in attribute data of the image data; and
      switches whether to add the correction value to each pixel according to the attribute of each pixel.

6. An image forming apparatus comprising:
   a first memory;
   a second memory; and
   a controller that:
      inputs in the first memory image data shifted 1 pixel at a time in a sub-scanning direction;
      executes a plurality of types of image processes;
      outputs a result;
      inputs and holds in the second memory each pixel of the image data input in the first memory in a unit of a plurality of pixels in the sub-scanning direction;
      compares each pixel value of the held plurality of pixels;
      detects an edge of a front end or a rear end of an object;
      counts a number of pixels that each pixel of the image data shifted in the sub-scanning direction from when the edge of the front end or the rear end is detected;
      uses a counted value to determine a distance coefficient to adjust the pixel value of each pixel of the object in a range of N pixels from the edge of the front end or the rear end according to a distance from the edge of the front end or the rear end;
      calculates a correction value of each pixel of the object using the distance coefficient; and
      adds the correction value of each pixel to the pixel value of each pixel of the image data output shifted 1 pixel at a time in the sub-scanning direction from the first memory and corrects the image data based on the correction value, wherein, a position where the correction value is added is a position shifted at least N+1 pixels from a position where each pixel is input to the second memory, and wherein the image forming apparatus prints the corrected image data.

7. The image forming apparatus according to claim 6, wherein
the controller further:
determines edge strength of the edge of the front end or the rear end;
determines a density coefficient according to the pixel value of the object in which the edge of the front end or the rear end is detected;
determines a line width coefficient according to a number of pixels from the edge of the front end to the edge of the rear end;
calculates a correction coefficient using at least one of the edge strength, the density coefficient, and the line width coefficient; and
uses the distance coefficient and the correction coefficient to calculate the correction value.

8. The image forming apparatus according to claim 7, further comprising:
a third memory which holds the correction coefficient of each pixel in the image data and the counted value.

9. The image forming apparatus according to claim 6, wherein the controller executes weighted averaging of the pixel value after correction for each pixel when an original pixel value of each pixel adjacent in a main scanning direction of the image data is same.

10. The image forming apparatus according to claim 6, wherein
the controller further:
determines an attribute of each pixel of the image data shown in attribute data of the image data; and
switches whether to add the correction value to each pixel according to the attribute of each pixel.

11. An image forming system comprising:
a first memory;
a second memory; and
a controller that:
inputs in the first memory image data shifted 1 pixel at a time in a sub-scanning direction;
executes a plurality of types of image processes; and outputs a result;
inputs and holds in the second memory each pixel of the image data input in the first memory in a unit of a plurality of pixels in the sub-scanning direction;
compares each pixel value of the held plurality of pixels;
detects an edge of a front end or a rear end of an object;
counts a number of pixels that each pixel of the image data shifted in the sub-scanning direction from when the edge of the front end or the rear end is detected;
uses a counted value to determine a distance coefficient to adjust the pixel value of each pixel of the object in a range of N pixels from the edge of the front end or the rear end according to a distance from the edge of the front end or the rear end;
calculates a correction value of each pixel of the object using the distance coefficient; and
adds the correction value of each pixel to the pixel value of each pixel of the image data output shifted 1 pixel at a time in the sub-scanning direction from the first memory and corrects the image data based on the correction value,
wherein, a position where the correction value is added is a position shifted at least N+1 pixels from a position where each pixel is input to the second memory, and wherein the image forming system prints the corrected image data.

12. The image forming system according to claim 11, wherein
the controller further:
determines edge strength of the edge of the front end or the rear end;
determines a density coefficient according to the pixel value of the object in which the edge of the front end or the rear end is detected;
determines a line width coefficient according to a number of pixels from the edge of the front end to the edge of the rear end;
calculates a correction coefficient using at least one of the edge strength, the density coefficient, and the line width coefficient; and
uses the distance coefficient and the correction coefficient to calculate the correction value.

13. The image forming system according to claim 12, further comprising:
a third memory which holds the correction coefficient of each pixel in the image data and the counted value.

14. The image forming system according to claim 11, wherein the controller executes weighted averaging of the pixel value after correction for each pixel when an original pixel value of each pixel adjacent in a main scanning direction of the image data is same.

15. The image forming system according to claim 11, wherein
the controller further:
determines an attribute of each pixel of the image data shown in attribute data of the image data; and
switches whether to add the correction value to each pixel according to the attribute of each pixel.

16. An image processing method using an image processing apparatus that comprises: a first memory; a second memory; and a controller, the method comprising:
inputting in the first memory image, by the controller, data shifted 1 pixel at a time in a sub-scanning direction;
executing, by the controller, a plurality of types of image processes;
outputting, by the controller, a result image data;
inputting and holding in the second memory, by the controller, each pixel of the image data input in the first memory in a unit of a plurality of pixels in the sub-scanning direction;
comparing, by the controller, each pixel value of the held plurality of pixels;
detecting, by the controller, an edge of a front end or a rear end of an object;
counting, by the controller, a number of pixels that each pixel of the image data shifted in the sub-scanning direction from when the edge of the front end or the rear end is detected;
using, by the controller, a counted value to determine a distance coefficient to adjust the pixel value of each pixel of the object in a range of N pixels from the edge of the front end or the rear end according to a distance from the edge of the front end or the rear end;
calculating, by the controller, a correction value of each pixel of the object using the distance coefficient; and adding, by the controller, the correction value of each pixel to the pixel value of each pixel of the result image data and correcting the image data based on the correction value, wherein, a position where the correction value is added is a position shifted at least N+1 pixels from a position where each pixel is input and held in the second memory, and wherein the image processing apparatus causes an image forming apparatus to print the corrected image data.

17. The image processing method according to claim 16, further comprising, determining, by the controller, an edge strength of the edge of the front end or the rear end;
   determining, by the controller, a density coefficient according to the pixel value of the object in which the edge of the front end or the rear end is detected;
   determining, by the controller, a line width coefficient according to a number of pixels from the edge of the front end to the edge of the rear end; and
   calculating, by the controller, a correction coefficient using at least one of the edge strength, the density coefficient, and the line width coefficient,
   wherein, the correction value is calculated using the distance coefficient determined and the correction coefficient.

18. The image processing method according to claim 17, further comprising:
   holding in a third memory the correction coefficient of each pixel in the image data and the counted value.

19. The image processing method according to claim 16, further comprising:
   executing, by the controller, weighted averaging of the pixel value after correction for each pixel when an original pixel value of each pixel adjacent in a main scanning direction of the image data is same.

20. The image processing method according to claim 16, further comprising:
   determining, by the controller, an attribute of each pixel of the image data shown in attribute data of the image data, and
   wherein in the adding of the correction value, whether to add the correction value to each pixel is switched according to the attribute of each pixel.

* * * * *